(12) United States Patent
Layfield

(10) Patent No.: US 12,144,336 B1
(45) Date of Patent: Nov. 19, 2024

(54) ROTATABLE TAIL DECOY

(71) Applicant: Corey Layfield, Campti, LA (US)

(72) Inventor: Corey Layfield, Campti, LA (US)

( * ) Notice: Subject to any disclaimer, the term of this patent is extended or adjusted under 35 U.S.C. 154(b) by 17 days.

(21) Appl. No.: 18/208,506

(22) Filed: Jun. 12, 2023

(51) Int. Cl.
A01M 31/06 (2006.01)

(52) U.S. Cl.
CPC .................................. A01M 31/06 (2013.01)

(58) Field of Classification Search
CPC ........ A01M 31/06; A63H 23/00; A63H 23/10
USPC .................................... 43/3, 2; 446/156, 158
See application file for complete search history.

(56) References Cited

U.S. PATENT DOCUMENTS

| | | | | | |
|---|---|---|---|---|---|
| 1,110,245 | A * | 9/1914 | Vaughan | ............... | A01M 31/06 43/3 |
| 1,185,559 | A * | 5/1916 | Vaughan | ............... | G11B 33/06 369/69 |
| 2,460,128 | A * | 1/1949 | Greenleaf | ............. | A01M 31/06 446/159 |
| 2,814,146 | A * | 11/1957 | Propp | ................... | A01M 31/06 43/3 |
| 2,835,064 | A * | 5/1958 | Webb | ..................... | A01M 31/06 43/3 |
| 2,849,823 | A * | 9/1958 | Miller | ................... | A01M 31/06 43/3 |
| 3,074,195 | A * | 1/1963 | Vanderpool | ........... | A01M 31/06 43/26.1 |
| 3,689,927 | A * | 9/1972 | Boston | .................. | A01M 31/06 213/3 |
| 4,612,722 | A * | 9/1986 | Ferrell | .................. | A01M 31/06 43/26.1 |
| 5,377,439 | A * | 1/1995 | Roos | ..................... | A01M 31/06 43/3 |
| 6,339,893 | B1 * | 1/2002 | Solomon | ............... | A01M 31/06 43/3 |
| 6,553,709 | B1 * | 4/2003 | Owen | .................... | A01M 31/06 446/153 |
| 6,708,440 | B2 * | 3/2004 | Summers | ............... | A01M 31/06 43/2 |
| 7,627,977 | B2 * | 12/2009 | Denny | .................. | A01M 31/06 43/2 |
| 7,966,963 | B1 * | 6/2011 | Caldwell | ............... | A01M 29/06 116/22 A |
| 8,584,395 | B2 * | 11/2013 | Tonkovich | ............ | A01M 31/06 43/2 |
| 9,265,246 | B2 * | 2/2016 | Thomas | ................. | A01M 31/06 |
| 9,414,583 | B2 * | 8/2016 | Burton | .................. | A01M 31/06 |
| 9,924,711 | B1 | 3/2018 | Gill, II | | |
| 10,212,929 | B2 * | 2/2019 | Janzen, Jr. | ............ | A01M 31/06 |
| 10,765,107 | B2 * | 9/2020 | Peoples | ................. | A01M 31/06 |

(Continued)

Primary Examiner — Tye William Abell
Assistant Examiner — Maria E Graber
(74) Attorney, Agent, or Firm — R. Keith Harrison

(57) ABSTRACT

A rotatable tail decoy which is suitable for deployment on a water body to attract game fowl to the decoy for hunting, observation, and/or other purposes may include a buoyant decoy body configured to float on the water body. The decoy body may have a fore/aft decoy axis. A decoy head may be provided on the decoy body. A decoy tail may be provided on the decoy body opposite the decoy head along the fore/aft decoy axis. The decoy tail may include a rotatable tail portion rotatable within a rotational plane generally perpendicular to the fore/aft decoy axis. A tail rotating assembly may drivingly engage the rotatable tail portion of the decoy tail for rotation of the rotatable tail portion within the rotational plane.

19 Claims, 7 Drawing Sheets

(56) References Cited

U.S. PATENT DOCUMENTS

| | | | |
|---|---|---|---|
| 10,980,226 B2 | 4/2021 | Fick et al. | |
| 2004/0025770 A1* | 2/2004 | Saunoris | B63B 34/05 |
| | | | 114/40 |
| 2014/0298706 A1* | 10/2014 | Turner | A01M 31/06 |
| | | | 43/2 |
| 2017/0086451 A1* | 3/2017 | Turner | A01M 31/06 |

* cited by examiner

ROTATABLE TAIL DECOY

FIELD

Illustrative embodiments of the disclosure generally relate to waterfowl decoys. More particularly, illustrative embodiments of the disclosure relate to a rotatable tail decoy having a decoy tail with a rotatable tail portion which attracts game fowl to the decoy typically for hunting, observation, and/or other purposes.

SUMMARY

Illustrative embodiments of the disclosure are generally directed to a rotatable tail decoy suitable for deployment on a water body to attract game fowl to the decoy for hunting, observation, and/or other purposes. An illustrative embodiment of the rotatable tail decoy may include a buoyant decoy body configured to float on the water body. The decoy body may have a fore/aft decoy axis. A decoy head may be provided on the decoy body. A decoy tail may be provided on the decoy body opposite the decoy head along the fore/aft decoy axis. The decoy tail may include a rotatable tail portion rotatable within a rotational plane generally perpendicular to the fore/aft decoy axis. A tail rotating assembly may drivingly engage the rotatable tail portion of the decoy tail for rotation of the rotatable tail portion within the rotational plane.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
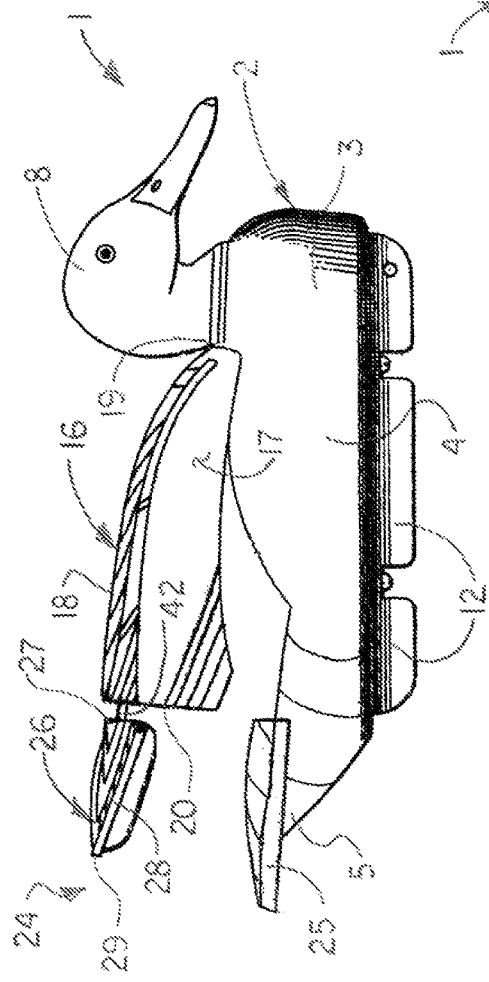
FIG. 1 is a side view of an illustrative embodiment of the rotatable tail decoy.
Figure 2:
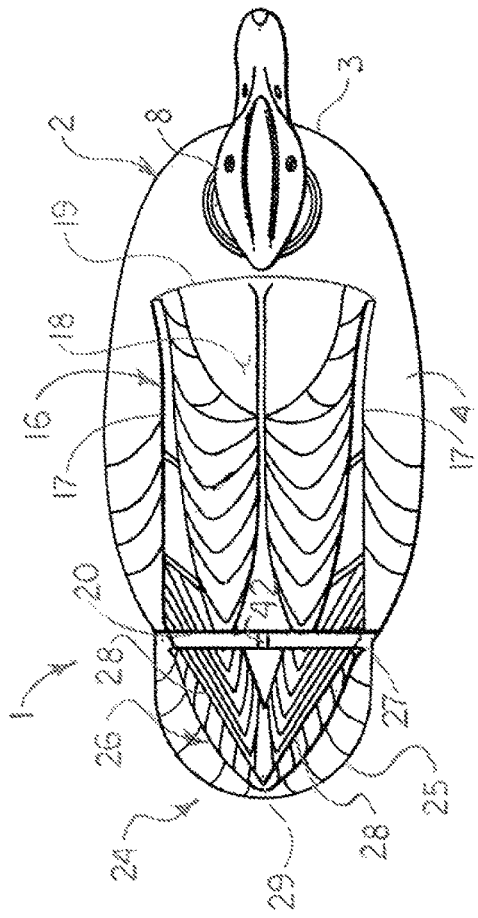
FIG. 2 is a top view of the illustrative rotatable tail decoy.
Figure 3:
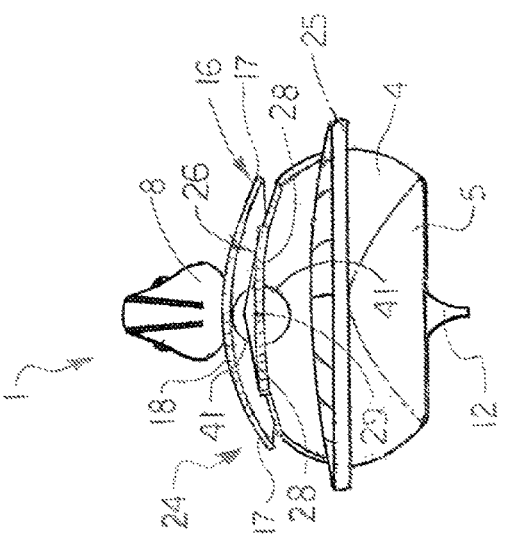
FIG. 3 is an aft or rear view of the illustrative rotatable tail decoy.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower", "left". "aft", "right", "fore", "vertical". "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Unless expressly or implicitly indicated otherwise, throughout the description and the appended claims, the terms"comprise", "comprising", "comprised of", "having", "including", and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition term "comprise" or "comprises" means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Unless otherwise noted using precise or limiting terminology, all numbers which express quantities of ingredients throughout the specification and claims are to be understood as being approximations of the numerical value cited to express the quantities of those ingredients. As used throughout the specification and claims, the terms "about" and "generally" have the meaning reasonably ascribed to those terms by a person skilled in the art when used in conjunction with a stated numerical value or range, i.e., denoting from the exact stated value or range to somewhat more or somewhat less than the stated value or range, from a deviation of from 0% with respect to the stated value or range to up to and including 15% of the stated value or range in either direction.

Figure 12:
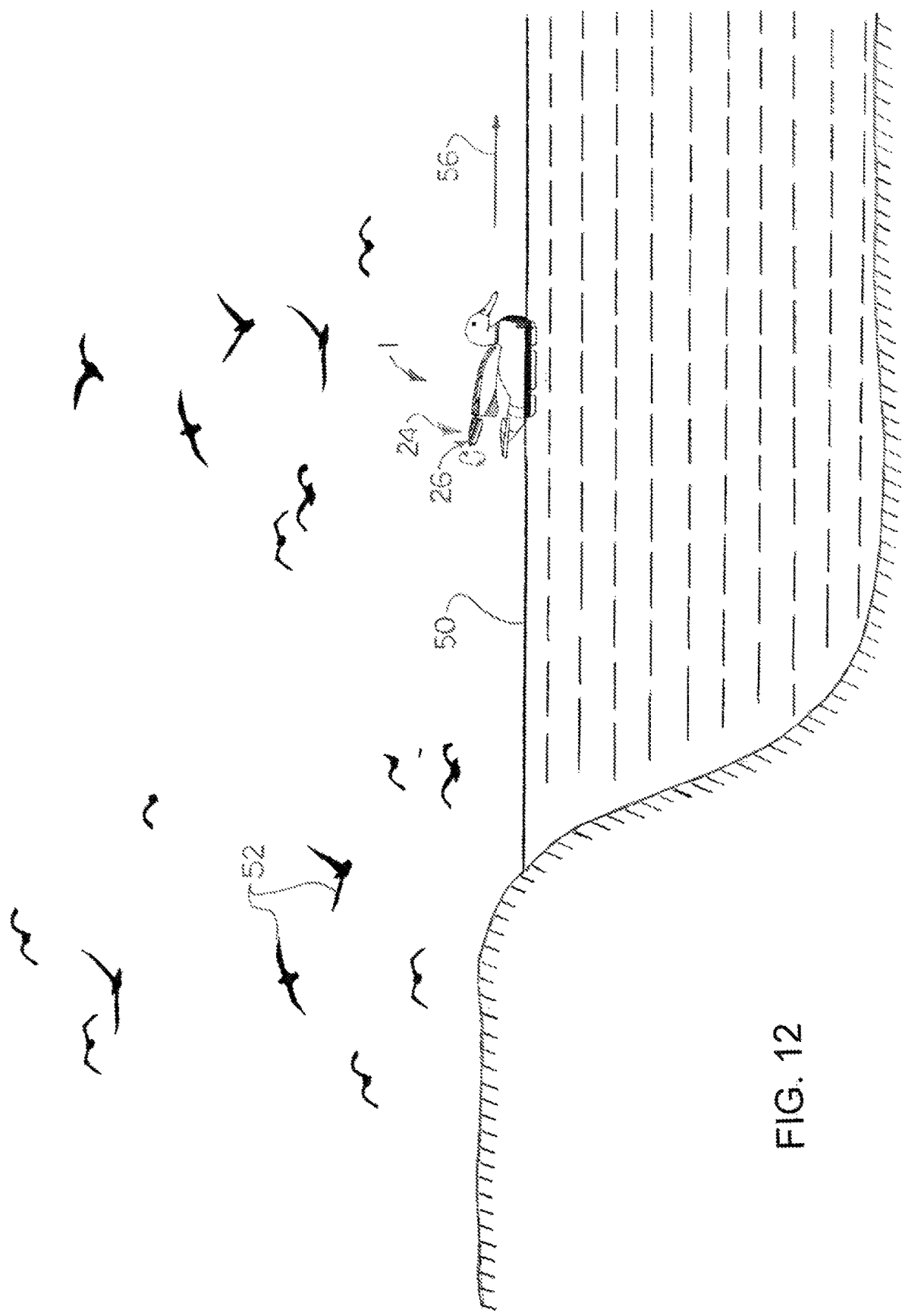
FIG. 12 is a side view of the illustrative rotatable tail decoy, floating on a water body in typical application of the rotatable tail decoy, with the rotatable tail portion of the decoy tail rotatable to attract game waterfowl.

Referring initially to FIG. 12 the drawings, an illustrative embodiment of the rotatable tail decoy, hereinafter decoy, is generally indicated by reference numeral 1. The decoy 1 may include a decoy tail 24 having a rotatable tail portion 26. In typical application, which will be hereinafter described, the decoy 1 may be suitable for deployment on a water body 50 such as a lake, river, pond, or the like, in an area in which game fowl 52 are present. The rotatable tail portion 26 of the decoy tail 24 may be rotated to attract the game fowl 52 to the decoy 1 for hunting, observation, and/or other purposes.

Figure 4:
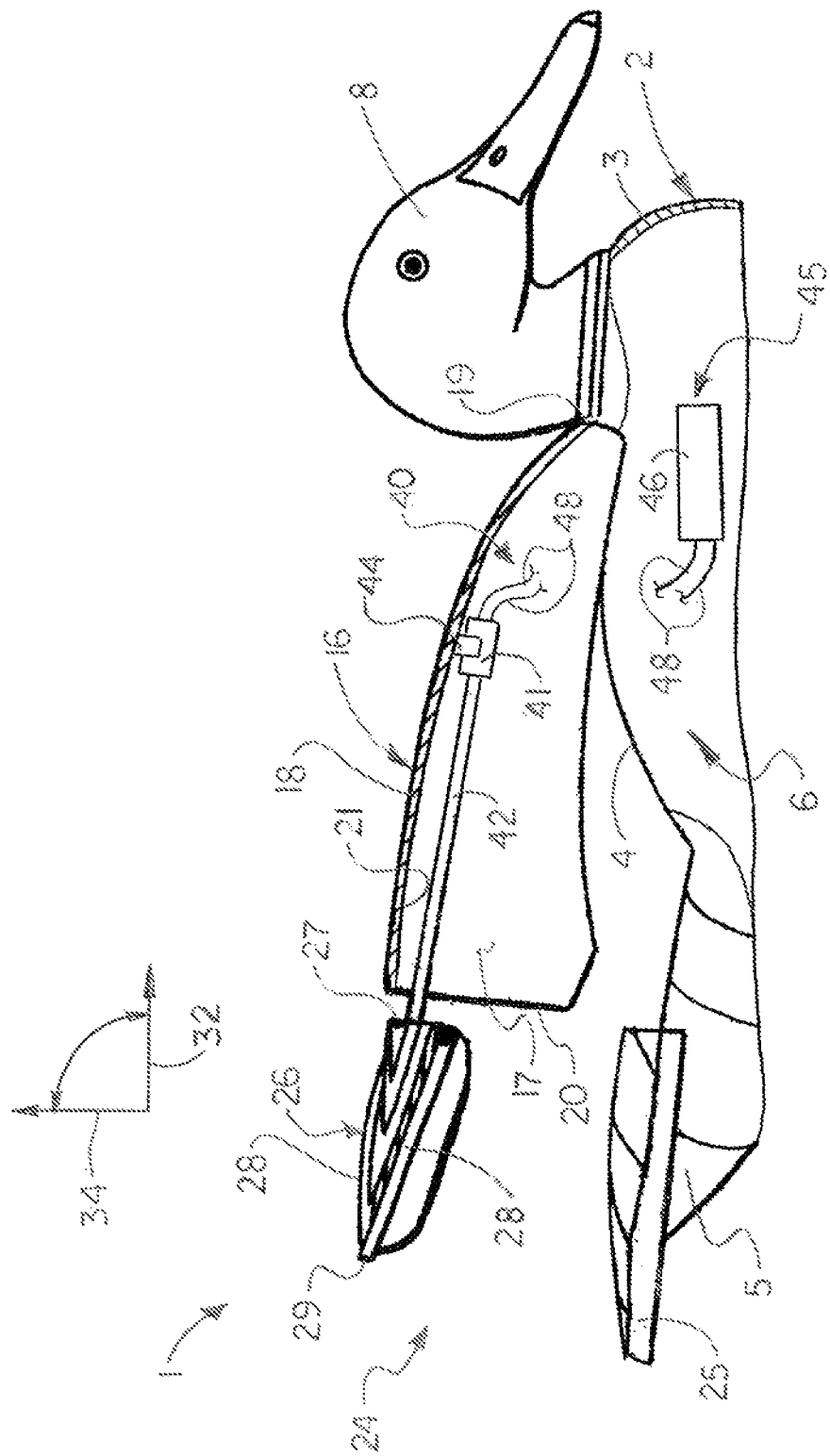
FIG. 4 is a sectioned side view of the illustrative rotatable tail decoy.

As illustrated in FIGS. 1-4, the decoy 1 may include a buoyant decoy body 2. The decoy body 2 may be configured to float on the water body 50. Accordingly, the decoy body 2 may be fabricated of buoyant materials such as plastic, closed cell extruded polystyrene foam (STYROFOAM™), other suitable materials, or combinations thereof. As illustrated in FIG. 4, the decoy body 2 may have a fore/aft decoy axis 32. The fore/aft decoy axis 32 may coincide with or extend parallel to a travel axis 56 (FIG. 12) along which the decoy 1 may travel as it floats in a forward or rearward direction on the water body 50 in some applications of the decoy 1, typically as will be hereinafter described.

Figure 6:
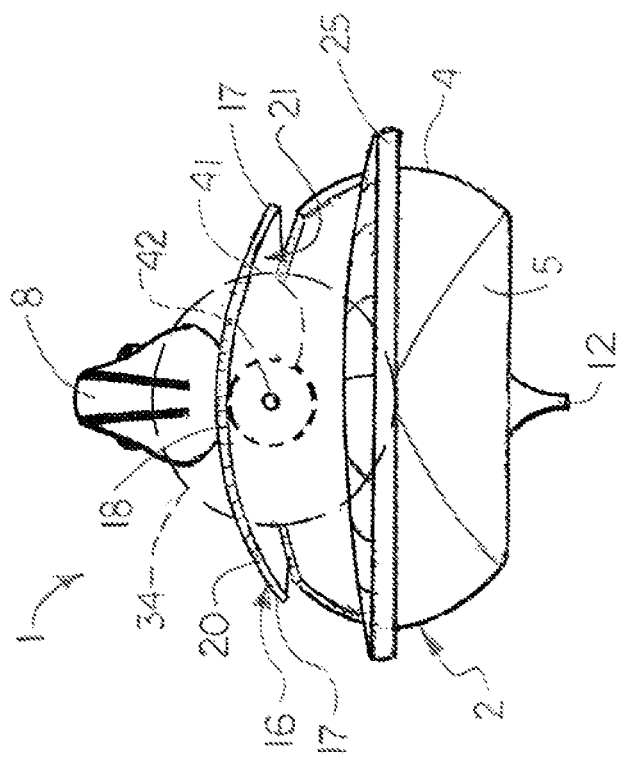
FIG. 6 is an aft or rear view of the illustrative rotatable tail decoy, with a drive motor of the tail rotating assembly rotating the rotatable tail portion of the decoy tail within a rotational plane in typical application of the rotatable tail decoy.
Figure 9:
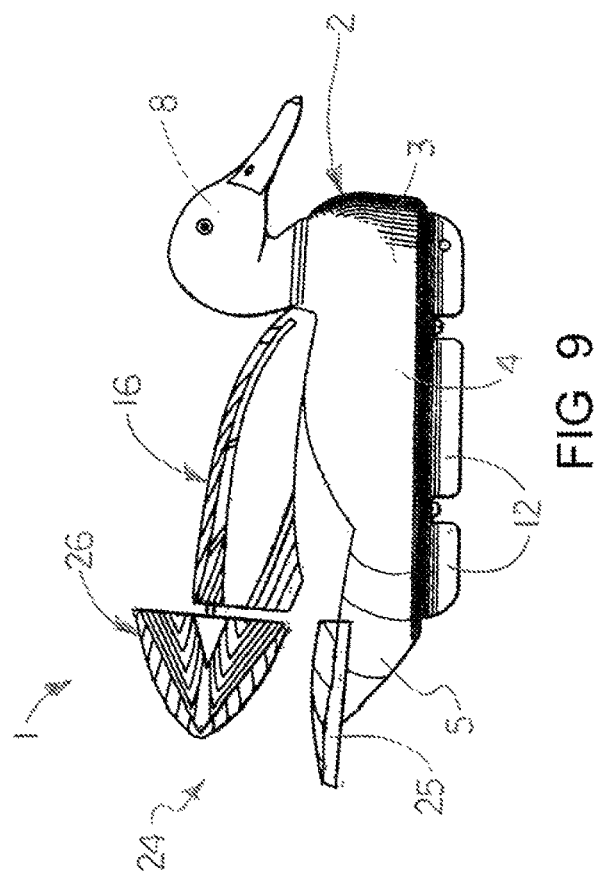
FIG. 9 is a side view of the rotatable tail decoy with the rotatable tail portion of the decoy tail in a 90-degree rotational position relative to the home position illustrated in FIG. 8.
Figure 8:
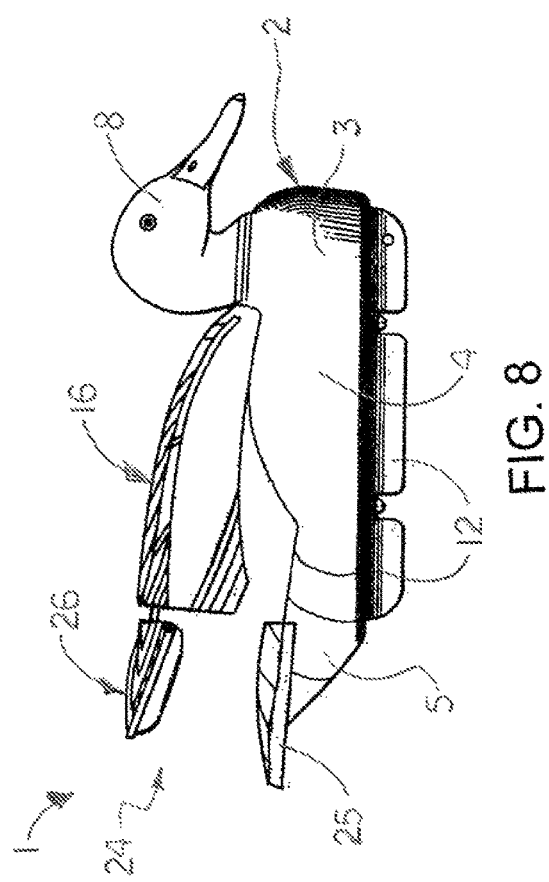
FIG. 8 is a side view of the illustrative rotatable tail decoy with the rotatable tail portion of the decoy tail in a home position.
Figure 10:
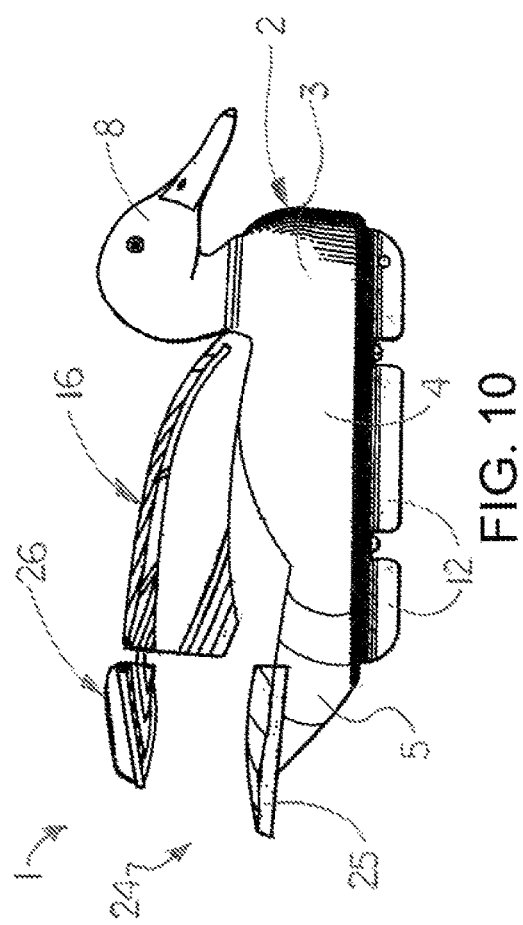
FIG. 10 is a side view of the rotatable tail decoy with the rotatable tail portion of the decoy tail in a 180-degree rotational position relative to the home position illustrated in FIG. 8.
Figure 11:
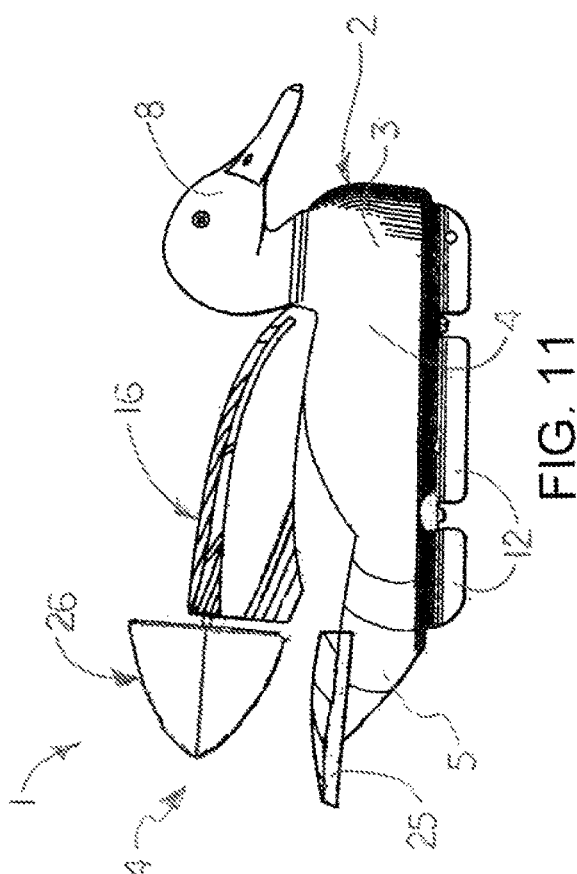
FIG. 11 is a side view of the rotatable tail decoy with the rotatable tail portion of the decoy tail in a 270-degree rotational position relative to the home position illustrated in FIG. 8.

A decoy head 8 may be provided on the decoy body 2. The decoy tail 24 may be provided on the decoy body 2 opposite the decoy head 8 along the fore/aft decoy axis 32. The decoy tail 24 may include the rotatable tail portion 26. As illustrated in FIG. 6, the rotatable tail portion 26 of the decoy tail 24 may be rotatable within a rotational plane 34. As illustrated in FIG. 4, the rotatable plane 34 within which the rotatable tail portion 26 rotates may be disposed generally perpendicular to the fore/aft decoy axis 32 of the decoy body 2.

Figure 5:
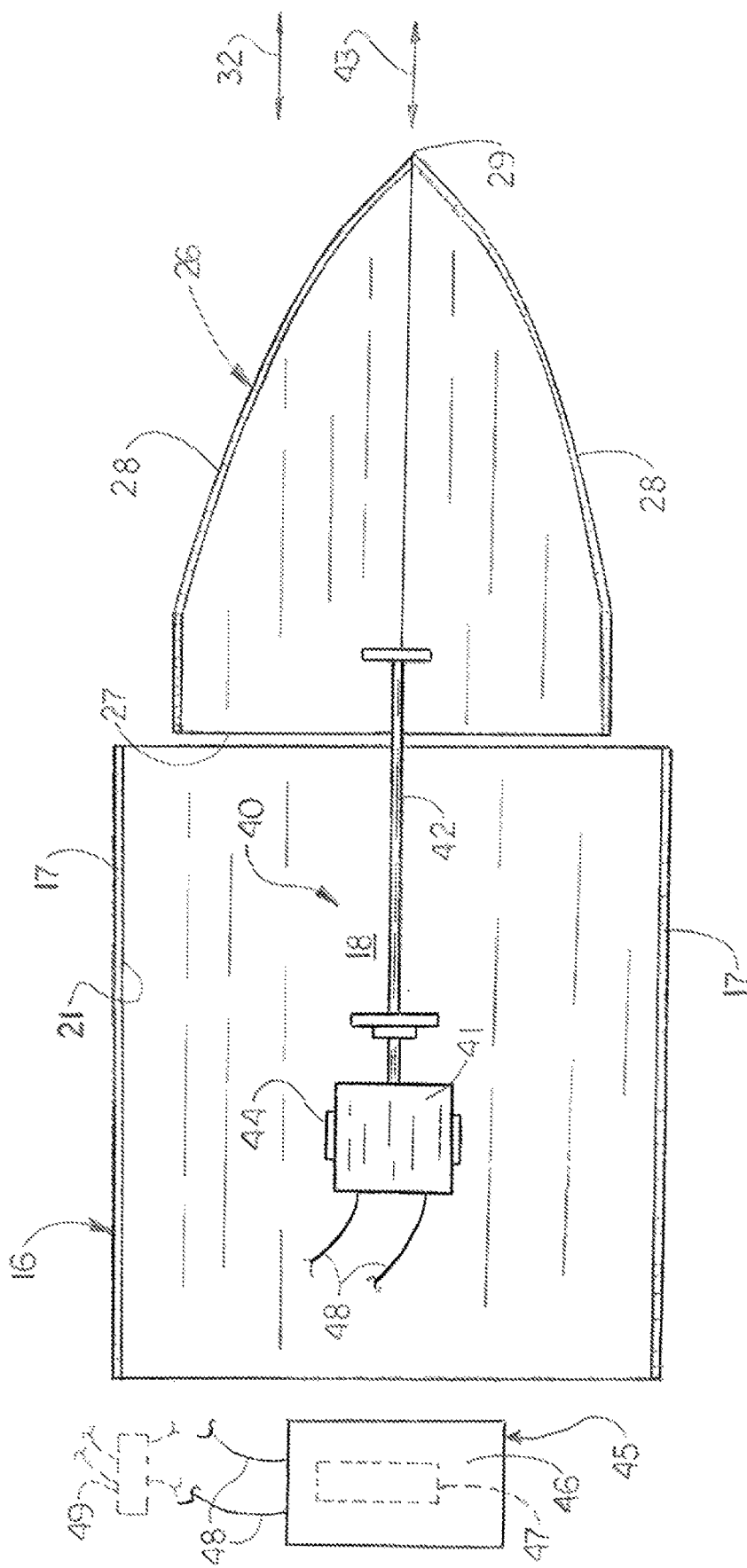
FIG. 5 is a bottom view of a typical decoy back flap and rotatable tail portion of the illustrative rotatable tail decoy, more particularly illustrating a typical tail rotating assembly suitable for rotating the rotatable tail portion of the decoy tail.
Figure 7:
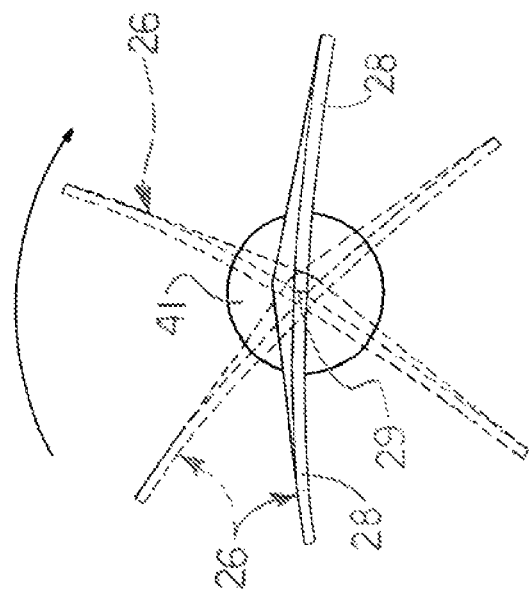
FIG. 7 is an aft or rear view of the rotatable tail portion of the decoy tail in various rotational positions during rotation.

As illustrated in FIGS. 4 and 5, a tail rotating assembly 40 may drivingly engage the rotatable tail portion 26 of the decoy tail 24. The tail rotating assembly 40 may be configured to rotate the rotatable tail portion 26 within the rotational plane 34, typically as will be hereinafter described.

The decoy 1 may resemble any type of game fowl 52 (FIG. 12) which is to be attracted by application of the decoy 1. For example and without limitation, in some embodiments, the decoy 1 may resemble the appearance of a duck, a goose, or any other game fowl. As illustrated in FIG. 1, in some embodiments, the decoy body 2 of the decoy 1 may have a fore body portion 3. A middle body portion 4 may extend aft of the fore body portion 3. An aft body portion 5 may extend aft of the middle body portion 4. The decoy head 8 may be provided on the fore body portion 3 of the decoy body 2. In some embodiments, the decoy tail 24 may include a fixed tail portion 25 on the aft body portion 5 of the decoy body 2. The fixed tail portion 25 may be disposed generally beneath and/or aft or to the rear of the rotatable tail portion 26. As illustrated in FIG. 4, at least a portion of the decoy body 2 may have a decoy body interior 6. In some embodiments, at least one decoy stabilizing fin 12 (FIG. 1) may extend from the decoy body 2 for stabilizing the decoy 1 on the water body 50.

A decoy back flap 16 may be supported by the decoy body 2. The rotatable tail portion 26 of the decoy tail 24 may be supported by the decoy back flap 16, typically as will be hereinafter described. As illustrated in FIG. 4, the decoy back flap 16 may include a back flap main wall 18. A pair of spaced-apart back flap sidewalls 17 may extend or curve outwardly from the back flap main wall 18. A flap interior 21 may be formed by and between the back flap main wall 18 and the back flap sidewalls 17 of the decoy back flap 16. As illustrated in FIGS. 4 and 5, in some embodiments, the tail rotating assembly 40 may be supported by the back flap main wall 18 in the flap interior 21 of the decoy back flap 16, typically as will be hereinafter described.

As further illustrated in FIG. 4, the decoy back flap 16 may have a fore flap end 19. The fore flap end 19 of the decoy back flap 16 may be attached to the fore body portion 3 of the decoy body 2, typically aft of the decoy head 8. The decoy back flap 16 may have an aft flap end 20 opposite the fore flap end 19. The tail rotating assembly 40 may drivingly engage the rotatable tail portion 26 of the decoy tail 24 behind or aft of the aft flap end 20 of the decoy back flap 16.

In some embodiments, the decoy back flap 16 may be pivotally attached to the decoy body 2 typically according to the knowledge of those skilled in the art. For example and without limitation, at least one flap hinge (not illustrated) may pivotally attach the fore flap end 19 of the decoy back flap 16 to the fore body portion 3 of the decoy body 2. The decoy back flap 16 may be selectively deployable in a closed flap position (not illustrated) in which the decoy back flap 16 closes the decoy body interior 6 of the decoy body 2 and an open flap position, as illustrated, in which the decoy back flap 16 opens and exposes the decoy body interior 6 typically for purposes which will be hereinafter described. In some embodiments, closure elements (not illustrated) such as at least one latch, magnet, or combinations thereof, for example and without limitation, may be utilized to secure the decoy back flap 16 in the closed flap position on the decoy body 2.

The tail rotating assembly 40 may have any design, device, or assembly or combination of devices or components suitable for drivingly engaging the rotatable tail portion 26 of the decoy tail 24 for rotation of the rotatable tail portion 26 within the rotational plane 34. For example and without limitation, as illustrated in FIGS. 4 and 5, in some embodiments, the tail rotating assembly 40 may include a drive motor 41. At least one motor mount bracket 44 may mount the drive motor 41 to the decoy back flap 16. At least one power supply 45 may electrically interface with the drive motor 41 such as via wiring and/or other suitable electrical interface 48, for example and without limitation. A drive shaft 42 may be drivingly engaged for rotation by the drive motor 41. The drive shaft 42 may drivingly engage the rotatable tail portion 26 of the decoy tail 24 for rotation of the rotatable tail portion 26. As illustrated in FIG. 5, the drive shaft 42 may have a rotational shaft axis 43 which may generally coincide with or be disposed generally parallel to the fore/aft decoy axis 32.

The power supply 45 may include any device, component, or combination thereof which is capable of supplying electrical current to the drive motor 41 for operation of the drive motor 41. For example and without limitation, in some embodiments, the power supply 45 may include a battery pack 46 having at least one battery 47. The battery or batteries 47 may be disposable and/or replaceable. In some embodiments, the power supply 45 may additionally or alternatively include at least one solar cell or panel (not illustrated). As illustrated in FIG. 4, in some embodiments, the power supply 45 may be disposed in the decoy body interior 6 of the decoy body 2. In other embodiments, the power supply 45 may be provided in the flap interior 21 of the decoy back flap 16 and/or in any other suitable location(s) or position(s) in or on the decoy 1.

As illustrated in phantom in FIG. 5, in some embodiments, at least one power switch 49 may operationally interface with the power supply 45 and the drive motor 41. The power switch 49 may facilitate selective operation of the drive motor 41. The power switch 49 may be provided in any position in the decoy body interior 6 of the decoy body 2, the flap interior 21 of the decoy back flap 16, and/or on the exterior of the decoy body 2 or the decoy back flap 16. The power switch 49 may be manually and/or wirelessly actuatable typically according to the knowledge of those skilled in the art.

In some embodiments, the rotatable tail portion 26 may have any size and shape which generally resembles or simulates at least a portion of the decoy tail 24 of the decoy 1. For example and without limitation, in some embodiments, the rotatable tail portion 26 may include a fore rotatable tail portion edge 27. A pair of side rotatable tail portion edges 28 may extend aft or rearwardly from the fore rotatable tail portion edge 27. The side rotatable tail portion edges 28 may converge at a rotatable tail portion tip 29. As illustrated in FIGS. 4 and 5, the drive shaft 42 of the tail rotating assembly 40 may drivingly engage the rotatable tail portion 26 at the fore rotatable tail portion edge 27. In some embodiments, a reflective material (not illustrated) may be provided on at least one surface of the rotatable tail portion 26 to reflect sunlight as the rotatable tail portion 26 rotates in attracting the waterfowl 52 to the decoy 1.

As illustrated in FIGS. 6-11, in some embodiments, the tail rotating assembly 40 may be operable to rotate the rotatable tail portion 26 of the decoy tail 24 in the clockwise or counterclockwise direction in a continuous 360-degree rotational path within the rotational plane 34. For example and without limitation, in FIG. 8, the rotatable tail portion 26 is shown in a home position. At FIGS. 9-12, the rotatable tail portion 26 is shown in a 90-degree rotational position, a 180-degree rotational position, and a 270-degree rotational position, respectively, relative to the home position illustrated in FIG. 8. In some embodiments, the tail rotating assembly 40 may be operable to rotate the rotatable tail portion 26 in alternating clockwise and counterclockwise directions. Accordingly, the power switch 49 (FIG. 5) may include or may be part of a controller which includes a user interface. The user interface may be manipulable by a user to facilitate the rotational speed, direction, and/or other functional or operational parameters of the drive motor 41.

In typical application of the decoy 1, the drive motor 41 of the tail rotating assembly 40 may initially be operated to rotate the rotatable tail portion 26 of the decoy tail 24 within the rotational plane 34. In some embodiments, this may be accomplished by actuating the power switch 49 (FIG. 5) to establish flow of electrical current from the power supply 45 to the drive motor 41. The decoy 1 may be placed on the surface of the water body 50. In some applications, the decoy 1 may be allowed to float on the water body 50 in the forward or rearward direction along the fore/aft decoy axis 32 and/or sideways or diagonally on the water body 50, typically depending on such factors as the direction of currents in the water body 50 and/or the wind on the water body 50. Alternatively, at least one anchor (not illustrated) may be tied to the decoy stabilizing fin 12 and/or other element of the decoy body 2 to anchor the decoy 1 in place on the water body 50. As the decoy 1 floats on the water body 50, the rotating rotatable tail portion 26 may enhance visibility of the decoy 1 and attract to the decoy 1 any game fowl 52 which may be flying in the vicinity of the decoy 1 typically for hunting, observation, and/or other purposes.

After use, the decoy 1 may be retrieved from the water body 50. The drive motor 41 may be turned off typically by actuation of the power switch 49. In some applications, the decoy back flap 16 may be deployed from the closed flap position to the open flap position to access the power switch 49 and/or the battery pack 46 of the power supply 45 for replacement of the battery or batteries 47, as deemed necessary. In some applications, the decoy 1 may be used as a standard or conventional decoy without the rotating action of the rotatable tail portion 26.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A rotatable tail decoy suitable for deployment on a water body, comprising:
    a buoyant decoy body configured to float on the water body, the buoyant decoy body having a fore/aft decoy axis;
    a decoy head on the buoyant decoy body;
    a decoy back flap carried by the buoyant decoy body; and
    a decoy tail on the buoyant decoy body opposite the decoy head along the fore/aft decoy axis, the decoy tail comprising a rotatable tail portion carried by the decoy back flap, the rotatable tail portion rotatable within a rotational plane generally perpendicular to the fore/aft decoy axis; and
    a tail rotating assembly drivingly engaging the rotatable tail portion of the decoy tail for rotation of the rotatable tail portion within the rotational plane.

2. The rotatable tail decoy of claim 1, wherein the decoy back flap comprises a fore flap end attached to the buoyant decoy body and an aft flap end opposite the fore flap end, and the tail rotating assembly drivingly engages the rotatable tail portion of the decoy tail at the aft flap end of the decoy back flap.

3. The rotatable tail decoy of claim 1, wherein the decoy back flap is pivotally carried by the buoyant decoy body.

4. The rotatable tail decoy of claim 1, wherein the decoy tail comprises a fixed tail portion.

5. The rotatable tail decoy of claim 1, wherein the rotatable tail portion of the decoy tail comprises a fore rotatable tail portion edge and a pair of side rotatable tail portion edges extending from the fore rotatable tail portion edge, the side rotatable tail portion edges converging at a rotatable tail portion tip, and wherein the tail rotating assembly drivingly engages the rotatable tail portion at the fore rotatable tail portion edge.

6. The rotatable tail decoy of claim 1, wherein the tail rotating assembly comprises a drive motor, at least one power supply electrically interfacing with the drive motor, and a drive shaft drivingly engaged for rotation by the drive motor, and wherein the drive shaft drivingly engages the rotatable tail portion of the decoy tail for rotation.

7. The rotatable tail decoy of claim 6, wherein the at least one power supply comprises a battery pack having at least one battery.

8. A rotatable tail decoy suitable for deployment on a water body, comprising:
    a buoyant decoy body configured to float on the water body, the buoyant decoy body having a fore/aft decoy axis and comprising:
        a fore body portion;
        a middle body portion extending aft of the fore body portion; and
        an aft body portion extending aft of the middle body portion;

a decoy head on the fore body portion of the buoyant decoy body;

a decoy back flap carried by the fore body portion of the buoyant decoy body aft of the decoy head;

a decoy tail on the aft body portion of the buoyant decoy body opposite the decoy head along the fore/aft decoy axis, the decoy tail comprising a rotatable tail portion rotatable within a rotational plane generally perpendicular to the fore/aft decoy axis; and a tail rotating assembly carried by the decoy back flap, the tail rotating assembly drivingly engaging the rotatable tail portion of the decoy tail for rotation of the rotatable tail portion within the rotational plane.

9. The rotatable tail decoy of claim 8, wherein the decoy tail comprises a fixed tail portion on the aft body portion of the buoyant decoy body.

10. The rotatable tail decoy of claim 8, wherein the rotatable tail portion of the decoy tail comprises a fore rotatable tail portion edge and a pair of side rotatable tail portion edges extending from the fore rotatable tail portion edge, the side rotatable tail portion edges converging at a rotatable tail portion tip, and wherein the tail rotating assembly drivingly engages the rotatable tail portion at the fore rotatable tail portion edge.

11. The rotatable tail decoy of claim 8, wherein the decoy back flap comprises a fore flap end attached to the buoyant decoy body and an aft flap end opposite the fore flap end, and the tail rotating assembly drivingly engages the rotatable tail portion of the decoy tail at the aft flap end of the decoy back flap.

12. The rotatable tail decoy of claim 11, wherein the decoy back flap is pivotally carried by the buoyant decoy body.

13. The rotatable tail decoy of claim 11, wherein the decoy back flap comprises a back flap main wall, a pair of spaced-apart back flap sidewalls extending from the back flap main wall, and a flap interior formed by and between the back flap main wall and the back flap sidewalls, and wherein the tail rotating assembly is carried by the back flap main wall in the flap interior of the decoy back flap.

14. The rotatable tail decoy of claim 8, wherein the tail rotating assembly comprises a drive motor, at least one power supply electrically interfacing with the drive motor, and a drive shaft drivingly engaged for rotation by the drive motor, and wherein the drive shaft drivingly engages the tail portion of the decoy tail for rotation.

15. The rotatable tail decoy of claim 14, wherein the at least one power supply comprises a battery pack having at least one battery.

16. A rotatable tail decoy suitable for deployment on a water body, comprising:

a buoyant decoy body configured to float on the water body, the buoyant decoy body having a fore/aft decoy axis and comprising:
a fore body portion;
a middle body portion extending aft of the fore body portion; and
an aft body portion extending aft of the middle body portion;

a decoy head on the fore body portion of the buoyant decoy body;

a decoy back flap having a fore flap end attached to the fore body portion of the buoyant decoy body aft of the decoy head and an aft flap end opposite the fore flap end along the fore/aft decoy axis, the decoy back flap comprising:
a back flap main wall;
a pair of spaced-apart back flap sidewalls curving outwardly from the back flap main wall; and
a flap interior formed by and between the back flap main wall and the back flap sidewalls;

a decoy tail on the aft body portion of the buoyant decoy body aft of the decoy back flap and opposite the decoy head along the fore/aft decoy axis, the decoy tail comprising a rotatable tail portion rotatable within a rotational plane generally perpendicular to the fore/aft decoy axis; and a tail rotating assembly drivingly engaging the rotatable tail portion of the decoy tail for rotation of the rotatable tail portion within the rotational plane, the tail rotating assembly comprising:
a drive motor carried by the back flap main wall in the flap interior of the decoy back flap;
at least one power supply electrically interfacing with the drive motor; and
a drive shaft drivingly engaged for rotation by the drive motor, the drive shaft drivingly engaging the rotatable tail portion of the decoy tail for rotation of the rotatable tail portion within the rotational plane.

17. The rotatable tail decoy of claim 16, wherein the decoy back flap is pivotally carried by the buoyant decoy body.

18. The rotatable tail decoy of claim 16, wherein the at least one power supply comprises a battery pack having at least one battery.

19. The rotatable tail decoy of claim 16, wherein the decoy tail comprises a fixed tail portion.

* * * * *